United States Patent
Kulczyk

(10) Patent No.: US 10,428,680 B2
(45) Date of Patent: Oct. 1, 2019

(54) MAGNETIC SENSOR SYSTEM FOR DETECTING ABNORMAL MOVEMENT IN A GAS TURBINE SHAFT

(71) Applicant: Weston Aerospace Limited, Farnborough, Hampshire (GB)

(72) Inventor: Wojciech Konrad Kulczyk, Farnborough (GB)

(73) Assignee: WESTON AEROSPACE LIMITED, Farnborough (GB)

( * ) Notice: Subject to any disclaimer, the term of this patent is extended or adjusted under 35 U.S.C. 154(b) by 565 days.

(21) Appl. No.: 15/219,833

(22) Filed: Jul. 26, 2016

(65) Prior Publication Data

US 2017/0030215 A1 Feb. 2, 2017

(30) Foreign Application Priority Data

Jul. 27, 2015 (GB) .................................. 1513205.3

(51) Int. Cl.
*F01D 21/00* (2006.01)
*G01M 15/14* (2006.01)
(Continued)

(52) U.S. Cl.
CPC ............. *F01D 21/003* (2013.01); *F01D 5/02* (2013.01); *G01D 5/2013* (2013.01);
(Continued)

(58) Field of Classification Search
None
See application file for complete search history.

(56) References Cited

U.S. PATENT DOCUMENTS 2,697,214 A * 12/1954 Smith .................. G01D 5/2283
324/207.17
4,774,458 A * 9/1988 Aronoff ................. G01B 7/001
324/140 D
(Continued)

FOREIGN PATENT DOCUMENTS

| EP | 0632250 A1 | 9/1999 |
| EP | 1930554 A2 | 6/2008 |
| GB | 2540379 A | 1/2017 |

OTHER PUBLICATIONS

European Patent Application No. 16181475.1, Extended European Search Report dated Jan. 9, 2017, 8 pages.
(Continued)

*Primary Examiner* — Jason D Shanske
*Assistant Examiner* — Jason G Davis
(74) *Attorney, Agent, or Firm* — Fredrikson & Byron, P.A.

(57) ABSTRACT

The present invention relates to a system (100, 300, 400) for detecting abnormal movement of a gas turbine shaft. The system comprises: a magnetic circuit (104, 302, 402) comprising a first magnetic portion (110, 304) and a second portion (112, 404), and including at least one air gap between the first portion and the second portion; and a detection coil (106) wound around the first magnetic portion. The second portion is coupled to or moveable with the shaft to reduce the air gap, on axial movement of the shaft to change the reluctance of the magnetic circuit and thereby induce a voltage in the coil. The system may comprise a controller (108) for shutting off power to the gas turbine when the induced voltage exceeds a threshold voltage.

18 Claims, 4 Drawing Sheets

(51) Int. Cl.
*G01D 5/20* (2006.01)
*F01D 5/02* (2006.01)

(52) U.S. Cl.
CPC ......... *G01M 15/14* (2013.01); *F05D 2220/32* (2013.01); *F05D 2240/60* (2013.01)

(56) References Cited

U.S. PATENT DOCUMENTS

| | | |
|---|---|---|
| 5,411,364 A | 5/1995 | Aberg et al. |
| 6,607,349 B2 | 8/2003 | Mulera et al. |
| 7,758,301 B2 * | 7/2010 | Bilson .................. F01D 21/045 415/118 |
| 9,052,178 B2 * | 6/2015 | Grosse .................. G01B 7/003 |
| 9,068,503 B2 | 6/2015 | Kulczyk |
| 2004/0060371 A1 | 4/2004 | Barkhoudarian |
| 2007/0241921 A1 | 10/2007 | Arguello et al. |
| 2008/0303515 A1 * | 12/2008 | Wolf ...................... G01B 7/003 324/207.24 |
| 2012/0107094 A1 | 5/2012 | Lillis |
| 2014/0241852 A1 | 8/2014 | Fuller et al. |
| 2016/0363000 A1 | 12/2016 | Oates |

OTHER PUBLICATIONS

GB Patent Application No. 1513205.3, Search Report dated Dec. 17, 2015, 3 pages.

\* cited by examiner

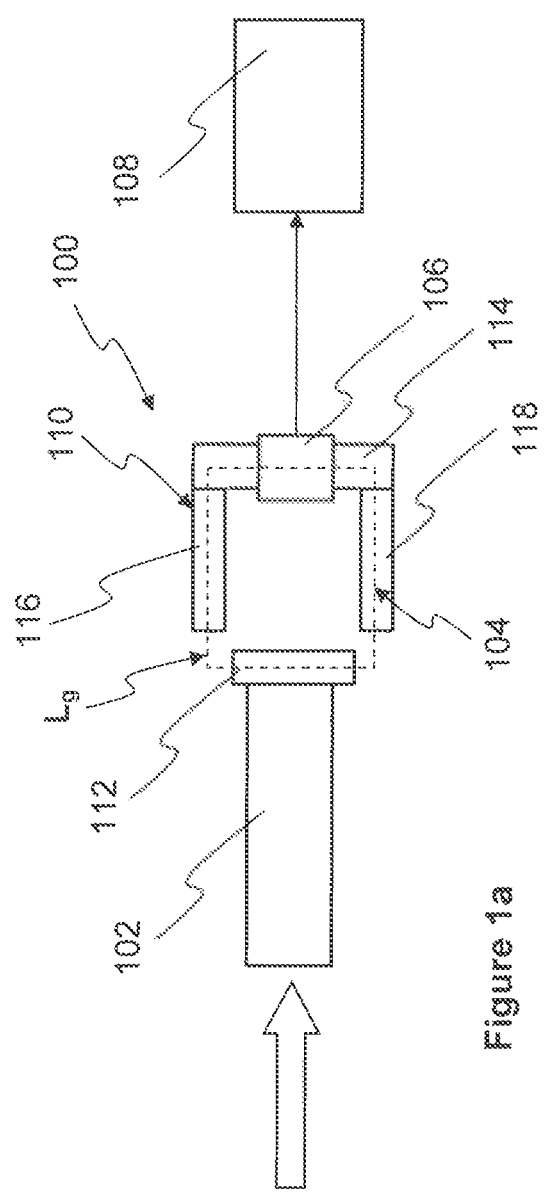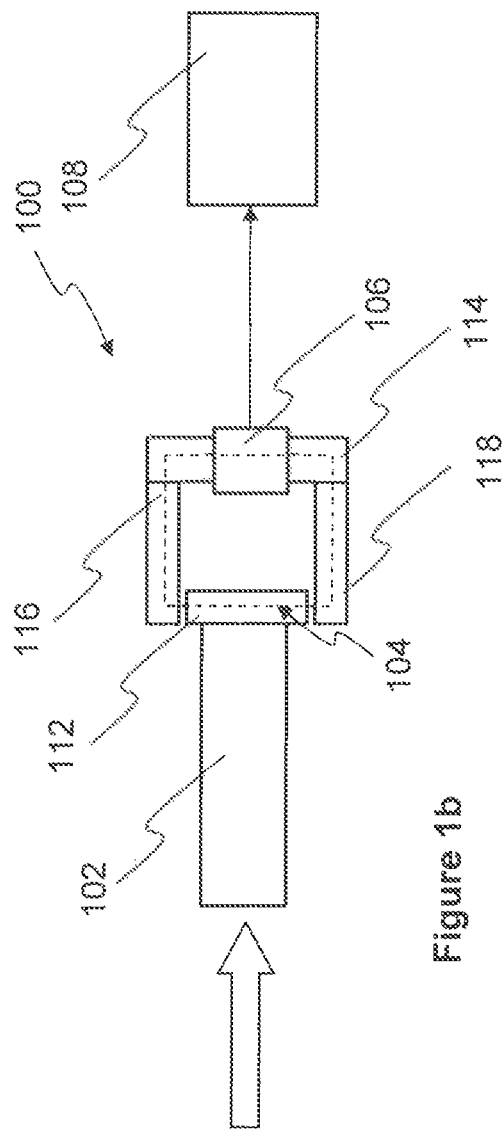

MAGNETIC SENSOR SYSTEM FOR DETECTING ABNORMAL MOVEMENT IN A GAS TURBINE SHAFT

The present invention is concerned with a magnetic sensor system for detecting abnormal movement of a gas turbine shaft. Abnormal movement of a gas turbine shaft is normally associated with the breaking of the shaft and the risk of so-called "turbine over speed". When the shaft of, for example, a jet engine breaks, the compressor mass is lost to the rotating system so the shaft and turbine then rotates significantly more quickly. The movement of the turbine can be sufficiently fast to cause the turbine to fly apart and break.

Gas turbine engines (e.g. jet engines) include a rotating shaft having compressor and/or turbine blades mounted thereon and rotating therewith. Axial movement of the shaft relative to the remainder of the engine is considered to be an abnormal movement and indicative of engine failure (e.g. shaft breakage). Detection of axial movement of the shaft relative to the remainder of the engine can therefore be used to detect engine failure and used to prevent further damage to the engine by activating a shut off of the engine. A shaft links the turbine and compressor. If the shaft is broken, the turbine portion moves backwards because of the effect of combustion gases. The compressor elements would lose power and stop rotating.

US 2012/0107094 A1 discloses a shaft speed and vibration sensor for turbomachinery such as gas turbines. The system comprises a sensor oriented proximate a shaft of the turbomachinery, generally provided between the compressor and turbine, configured to monitor the rotational speed and vibrational characteristics by monitoring target indicia provided on the shaft. The sensor may be a reluctance sensor, the target indicia being magnetic material. Such an arrangement is sensitive to the orientation of the sensor relative to the shaft, to the number of targets and their configuration, and to the rotational speed of the shaft.

It is also known to detect abnormal movement of a gas turbine shaft relative to the engine casing by providing a circuit breaking element which is fixed to the shaft and moves therewith if and when the shaft moves in an axial direction to break a circuit and thereby produce a signal.

U.S. Pat. No. 5,411,364 discloses an electro optic sensor for sensing unwanted or abnormal axial movement of turbine blades or rotors of a gas turbine. The sensing arrangement includes a pair of fibre optic wave guides interconnected through a frangible member disposed axially adjacent the turbine blades. Upon axial movement of the blades or rotors associated with the wave guides. Associated electronic circuitry generates an output signal indicative of failure of the gas turbine rotor.

U.S. Pat. No. 6,607,349 discloses a broken shaft detection system and a method which uses a detector assembly mounted downstream of a power turbine wheel of a gas turbine engine to detect rearward axial motion of the wheel and thereby a broken shaft event. The detector assembly has a plunger positioned to be axially displaced against a link connected in an electrical circuit. The link may be broken when the plunger is displaced thereby creating an open circuit that may be detected by a detection and test element. The breaking may be communicated to an over-speed circuit that controls a shut off switch that interrupts fuel flow to the engine. The link may be connected to the detection and test element by two pairs of parallel wires to facilitate monitoring of circuit function and to detect failures that are not broken shaft event failures.

US 2007/0241921 discloses a frangible sensor element which is cut by a separating tang mounted on and moving axially with a gas turbine shaft when the shaft fails. The frangible sensor element includes a longish, mechanically severable sensor element, which is severed by the separating tang when this moves as a result of shaft failure. One embodiment of US 2007/0241921 has a circuit formed by two wires connected at the distal or free end of the sensor element by a resistor of a defined value, and another embodiment has a circuit in which two pairs of wires are looped or bent at the free or distal end of the sensor element to define a single continuous conductive path running from the proximal end of the frangible sensing element, to its distal end, then back to its proximal end before returning to its distal end and then returning to its proximal end.

A problem with the arrangement of US 2007/0241921 which relies on monitoring changes in current (and hence resistance) caused by the switch from a first resistive circuit to a second different resistive circuit is that the values of resistance vary with temperature. As jet engines and other gas turbines are high temperature environments, there is therefore a risk of a false alarm. This means that such sensors have small operating margins.

It is very important to avoid false alarms. Typically the sensor monitoring for shaft breakage is directly coupled to an engine cut-off to automatically and very quickly shut off the engine when the shaft breaks. False alarms therefore lead to the engine stopping when there is no need to do so. For a jet having two engines, turning one off unnecessarily has a clear risk.

The present invention provides a system according to claim 1. Preferred features are defined in dependent claims 2 to 16.

The system of the present invention solves a number of problems associated with the known systems in the art which use frangible links to detect abnormal shaft movement. In particular, when the turbine shaft fails but does not move a sufficient distance to break the frangible link then the failure signal will not be generated. This may occur due to the clearances required to account for tolerance variations between the parts of the critical stack. As will be appreciated, during the lifetime of the gas turbine, the parts will wear which will enable the shaft to move in the axial direction. Therefore, as well as accounting for tolerance variations between parts, the clearances must also account for wear in those parts, and in particular wear in the shaft bearings.

In addition, the frangible link must be sufficiently weak that when the turbine shaft fails, the link is completely broken. However, this must be weighed against the frangible link being strong enough to withstand the harsh environment of a gas turbine. It has also been found that the material of the frangible link can cold flow when acted upon by the plunger, whereby electrical continuity is preserved.

In U.S. Pat. No. 6,607,349, the plunger must be of an insulating material to prevent the plunger from preserving the continuity of the frangible link even when the link is broken.

The high temperature environment means that it is difficult to provide a guide support for the plunger. As such, the plunger is able to move transverse to the axial direction which may prevent the frangible link from being broken cleanly.

By providing a system which does not have a frangible link, at least some of the above problems may be mitigated. In addition, by providing a system which is sensitive to the rate of change of the axial movement of the shaft, and not the absolute chance in the axial movement, others of the above problems may be mitigated.

Any feature in one aspect of the invention may be applied to other aspects of the invention, in any appropriate combination. Furthermore, any, some or all features in one aspect can be applied to any, some or all features in any other aspect, in any appropriate combination.

It should also be appreciated that particular combinations of the various features described and defined in any aspects of the invention can be implemented and/or supplied and/or used independently.

Preferred embodiments of the present invention will now be described, by way of example only, with reference to the attached figures. The figures and following description are intended to exemplify the invention and it will be readily appreciated that alternative embodiments of the invention are envisaged and are covered by the scope of the claims.

FIG. 1a shows a schematic illustration of a system for detecting abnormal movement of a gas turbine shaft according to a first embodiment of the present invention;

FIG. 1b shows the system of FIG. 1 in a configuration when the shaft is in an abnormal position;

Figure 2:
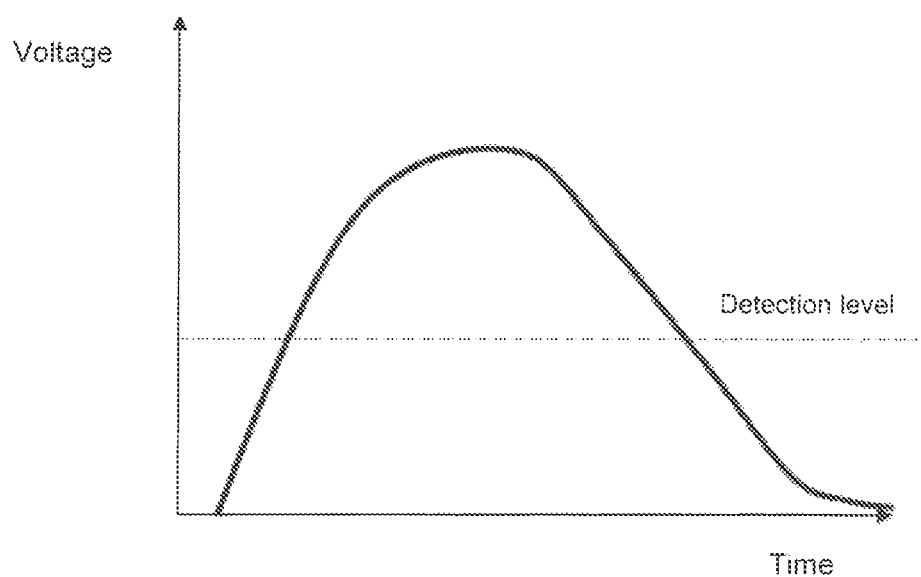
FIG. 2 shows a plot of a representative voltage output of the sensing system.

The system of the present invention for detecting abnormal movement in a gas turbine finds particular application in jet engines. A typical two spool turbo fan, jet engine comprises an intake, a fan, a nacelle, compressors, a combustion chamber, a fan nozzle, turbines, and a core nozzle. The engine also comprises an engine control unit (ECU), which, among other operations, is configured to control the flow of fuel to the engine.

The engine may include a fan across the air intake. The fan is mounted on a shaft on which are also mounted the compressor rotors or blades and the turbine rotors or blades. The system of the present invention is configured to be mounted adjacent the downstream end of the shaft.

The term "axial", as used herein, refers to the direction of the axis of rotation of the shaft. The term transverse as used herein, refers to the direction perpendicular to the axis of rotation of the shaft. The term "downstream", as used herein, refers to the direction from the intake of the engine towards the exhaust. The term "upstream" as used herein, refers to the direction opposite to the "downstream" direction.

The portion of the turbine in which the system is located is, when the jet engine is in use, a high temperature environment. Temperatures in the engine can exceed 800° C. which means that the environment is an aggressive one.

FIGS. 1a and 1b are schematic illustrations of a system for detecting abnormal movement of a gas turbine in accordance with an embodiment of the invention. The system comprises a plunger 102 mountable within a gas turbine engine (not shown). The system further comprises a magnetic circuit, represented by dashed line 104, a detection coil 106 and a controller 108.

As used herein, the term "magnetic circuit" refers to a circuit of one or more closed loop paths containing a magnetic flux. The flux may be generated by permanent magnets or electromagnets and the flux is confined to the path by magnetic cores consisting of soft magnetic materials. The path may include one or more air gaps or other materials.

The magnetic circuit 104 comprises a first portion 110, and a second portion 112. The first portion 110 comprises a base portion 114 and two arm portions 116 and 118. Each arm portion 116 and 118 has a proximal end, adjacent the base portion 114 and a free distal end. The first portion 110 of the magnetic circuit is thereby provided with a C-shape, or a U-shape. The second portion 112 is coupled to the plunger 102. In normal operation of the gas turbine, the system is configured to have an air gap, $L_g$, between the free distal ends of the arm portions 116 and 118 and the second portion 112.

The base portion 114 of the first portion of the magnetic circuit is formed of a magnetic material. As discussed above, the system operates in harsh and high temperature environments, and the materials used to form the various components of the system are chosen accordingly. The magnetic material is preferably a soft magnetic material, and preferably has a relatively high Curie temperature. Particularly appropriate materials are Cobalt, which has a Curie temperature of about 1128 degrees C., and Iron which has a Curie temperature of about 771 degrees C.

In the embodiment of FIGS. 1a and 1b, the arm portion 116 is a permanent magnet. The arm portion 116 is also preferably formed from a soft magnetic material, and again preferably has a high Curie temperature. A particularly appropriate permanent magnet is Al—Ni—Co formed from iron Aluminium, Nickel and Cobalt Al—Ni—Co has a Curie temperature of about 860 degrees C.

The arm portion 118 is formed of a magnetic material as described above with reference to the base portion 114. Preferably, the arm portion 118 and the base portion 114 are formed of the same material.

As shown in FIG. 1a, the base portion 114 and the arm portions 116 and 118 are separate components. However, as will be appreciated, the base portion 114, and arm portions 116 and 118 may be integral. In this case, the whole of the first portion 110 may be formed of a permanent magnet, or a section of the first portion 110 may be formed of a permanent magnet. In either case, the arm portions 116 and 118 and the base portion 114 are elongate, and may have a square, or any other suitable, cross-sectional shape.

In the embodiment shown in FIGS. 1a and 1b, the second portion 112 of the magnetic circuit 104 is configured to fit within the arm portions 116 and 118 with a clearance to prevent the second portion 112 from contacting the arm portions during an abnormal movement. Such a configuration enables the air gap, $L_g$, to be minimised. The clearance provided is such that, even under abnormal transverse movement of the plunger, the second portion 112 does not contact the first portion 110.

However, the system 100 may be configured such that the second portion 112 does not fit within the arm portions but rather is configured such that the distal ends of the second portion 112 overlap the distal ends of the arm portions 16 and 118. In this alternative, the system is configured such that, even under abnormal axial movement, the second portion does not contact the arm portions.

The detection coil 106 is wound around the base portion 114. The coil is preferably formed of high temperature wires such as platinum wires with ceramic insulation or mineral insulated cables which can operate up to 1100 degrees C. The coil is electrically coupled to the controller 108. The controller 108 is discussed in detail below.

As discussed above, during normal operation of the gas turbine, the second portion 112 of the magnetic circuit 104 is separated from the first portion 110 by the air gap $L_g$. Providing the air gap results in a magnetic circuit having a high reluctance, R. The reluctance, R, of the circuit is given by the following formula:

$$R = L_m/\mu_m A_c + L_g/\mu_g A_c$$

where, $L_m$ is the magnetic path length, $L_g$ is the length of the air gap, $\mu_m$ is the magnetic permeability of the material forming the circuit, $\mu_g$ is the magnetic permeability of air, and $A_c$, is the core area of the circuit. In this case, the core area is the cross-sectional area of the first and second portions 116, 118 of the magnetic circuit 104.

FIG. 1b shows the system 100 during an abnormal movement of the gas turbine shaft. For example, such an abnormal movement may occur when the shaft fails, separating the compressor from the turbine, whereby the loads acting on the turbine are such that it moves axially downstream. The abnormal shaft movement may be between about 5 mm and about 7 mm, in a particular example the abnormal shaft movement is about 7 mm.

When the shaft fails it acts on the plunger 102 and pushes it axially towards the first portion 110 of the magnetic circuit 104 and therefore reduces the air gap $L_g$ between the distal ends of the arm portions 116 and 118 and the second portion 112. Under this condition the reluctance, R, of the magnetic circuit 104 is significantly reduced causing a rapid increase of the magnetic flux, $\phi$, in the circuit. The change in magnetic flux generates an electric signal in the detection coil 106 wound around the base portion 114.

The voltage amplitude of the induced signal is proportional to the change of flux and is given by the formula:

$$V = d\phi/dt \times K$$

where K is a constant, $\phi$ is the magnetic flux in the circuit, and t is time.

The magnetic flux is given by the formula.

$$\phi = F/R = F/(L_m/\mu_m A_c + L_g/\mu_g A_c)$$

where F is the magnetomotive force (MMF) and R is the reluctance.

In the embodiment of FIGS. 1a and 1b, and as discussed above the MMF is generated by permanent magnet 116.

The induced voltage signal in the detection coil 106 is in the form of a short pulse, for example a short pulse as shown in FIG. 2. This pulse is detected by the controller and compared to a threshold voltage. The threshold voltage is pre-set during configuration of the system at a level which is crossed when an abnormal movement of the shaft occurs. It is important that the threshold voltage is set at a level which does not result in false positives but also at a level which does not fail to determine when an abnormal movement occurs. On determining that the induced voltage in the detection coil has crossed the threshold voltage, the controller may send a signal to the ECU to shut off the engine. In one example, the controller bypasses the normal operation of the ECU and directly shuts off fuel supply to the engine.

Abnormal movement caused by shaft failure occurs very rapidly, and must be controlled very quickly, within 1 or 2 ms, to prevent catastrophic damage to the gas turbine. As shown above, the voltage pulse generated in the detection coil is dependent on the rate of change of magnetic flux in the magnetic circuit. As such, the voltage generated by abnormal movement, which occurs over a shorter time period, and over a greater distance than normal movements during normal operation, is significantly larger than the voltage induced during normal operation. Unlike known abnormal movement detection systems, the present system is therefore sensitive to the rate of change of movement, and not to the absolute movement.

The system of the present invention may therefore compensate for movements caused by wear on the turbine components during use. As will be appreciated, the maintenance period between bearing replacement may be 30,000 hours or more of engine running time, during which time the bearings will wear, enabling the shaft to move in the downstream direction when under load. The slow absolute movement of the shaft caused by wear will occur over a relatively long time period which, although resulting in a decrease in the reluctance, R, of the magnetic circuit, will not induce a voltage in the detection coil sufficient to cross the threshold voltage. Known abnormal movement detection systems, such as that of U.S. Pat. No. 6,607,349, may not compensate for such movements, and thus are more likely to produce false positives towards the end of the maintenance period when the distance that the shaft must move to break the link is reduced. Periods of increased, but normal movement, for example during acceleration and deceleration, may be particularly problematic.

As discussed above, the environment in which the detection system is used is harsh, and may vibrations and other interferences can result in noise in the voltage signal induced in the detection coil. The controller 108 may therefore amplify the voltage signal, which may only be of the order or millivolts, and filter the signal before comparing the signal to the voltage threshold. Such amplification and filtering are well-known to those skilled in the art, and the specific configuration of such amplifiers and filters will be dependent on the design of the particular abnormal movement detection system, for example dependent on the physical size of the magnetic circuit. Any suitable voltage threshold detector may be used and are known to those skilled in the art.

Figure 3:
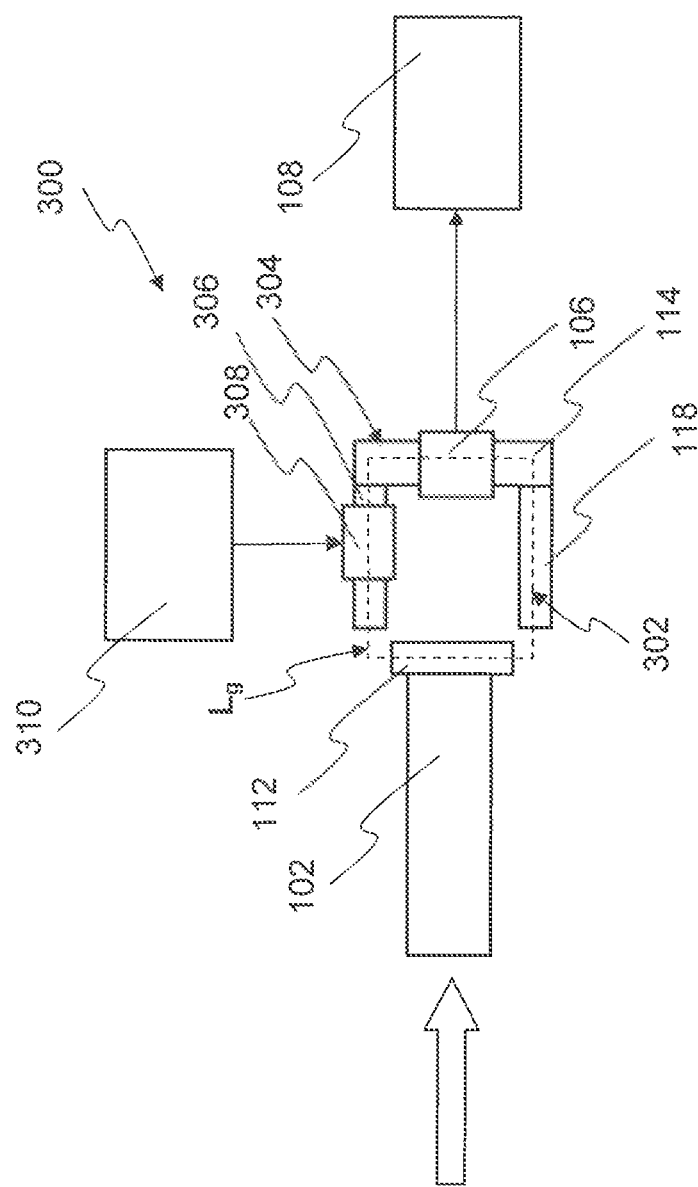
FIG. 3 shows a schematic illustration of a system for detecting abnormal movement of a gas turbine shaft according to a second embodiment of the present invention.

FIG. 3 is a schematic illustration of a system 300 for detecting abnormal movement of a gas turbine in accordance with a further embodiment of the invention. The system 300 is similar to that described with reference to FIGS. 1a and 1b, and like reference numerals refer to like components. The system 300 again comprises a plunger 102 mountable within a gas turbine engine (not shown). The system 300 further comprises a magnetic circuit, represented by dashed line 302, a detection coil 106 and a controller 108. In FIG. 3, the system is shown in the normal operating condition.

The magnetic circuit 302 comprises a first portion 304, and the second portion 112. The first portion 304 comprises a base portion 114 and two arm portions 118 and 306. Each arm portion 118 and 306 has a proximal end, adjacent the base portion 114 and a free distal end. The second portion 112 is coupled to the plunger 102. In normal operation of the gas turbine, the system is configured to have an air gap, $L_g$, between the free distal ends of the arm portions 118 and 306 and the second portion 112. In this respect, the system 300 is the same as system 100 as described above.

The base portion 114 of the first portion of the magnetic circuit is formed of a magnetic material. As discussed above, the system operates in harsh and high temperature environments, and the materials used to form the various components of the system are chosen accordingly. The magnetic material is preferably a soft magnetic material, and preferably has a relatively high Curie temperature. Particularly appropriate materials are Cobalt, which has a Curie temperature of about 1128 degrees C., and Iron which has a Curie temperature of about 771 degrees C.

The arm portion 118 is the same as described above with reference to FIGS. 1a and 1b. However, in the system 300 shown in FIG. 3, the MMF of the magnetic circuit 302 is provided by an electromagnet, and not by a permanent magnet. As such, arm portion 306 is formed from a magnetic material, which is preferably the same as the magnetic material used to form base portion 114 and arm portion 118. A coil 308 is wound around arm portion 306 to form the electromagnet. A power supply 310 is electrically coupled to the coil 308 for providing a current source to the coil to power the electromagnet, and thereby provide the MMF of the magnetic circuit 302.

The coil 308 may be formed of the same or similar material to that described above as being suitable for the detection coil 108.

The MMF, F, of the magnetic circuit 302 is therefore given by the formula:

$$F = n \times i$$

where, n is the number of turns of the coil 308, and i is the current supplied by the power supply 310. In the embodiment shown in FIG. 3, the power supply 310 is configured to supply a constant current.

The operation of the system 300 is the same as that of system 100 described above. Therefore, during an abnormal movement of the gas turbine shaft, the air gap $L_g$ between the distal ends of the arm portions 118 and 306 and the second portion 112 is reduced. Again, the reluctance, R, of the magnetic circuit 104 is significantly reduced causing a rapid increase of the magnetic flux, φ, in the circuit. The change in magnetic flux generates an electric signal in the detection coil 106 wound around the base portion 114. When the voltage of the electric signal crosses a pre-set threshold, an alarm is triggered, which as described above is used to initiate engine shut-down, for example by shutting off the fuel supply.

In an alternative, yet similar, embodiment a system is provided where the MMF is provided by supplying a constant current to the detection coil 106 in this embodiment, as will be appreciated, the power supply 310 is preferably incorporated into the controller 108 and the coil 308 is not provided. All other components of the system, and the operation thereof, are the same as for system 300 described above with reference to FIG. 3. In this alternative embodiment, a filter, such as an electronic filter, may be used to filter out the induced voltage signal.

A yet further embodiment of the invention utilises an alternating current source in the system 300, instead of the constant current source 310 described above. As such, the induced voltage signal in the detection coil 106 is given by the formula:

$$V = d\phi/dt \times K = d\{(n \times i)/(L_m/\mu_m A_c + L_g/\mu_g A_c)\}/dt \times K$$

where, $i = i_0 \cos(\omega t)$.

The induced voltage signal in the detection coil 108 may be filtered to remove noise. The alternating current may have a frequency between about 50 Hz and around 20 kHz, and in one example the frequency is about 1 kHz. In this example a narrow band-pass filter is used centred about 1 kHz to remove noise induced by the harsh environment of the engine.

Figure 4:
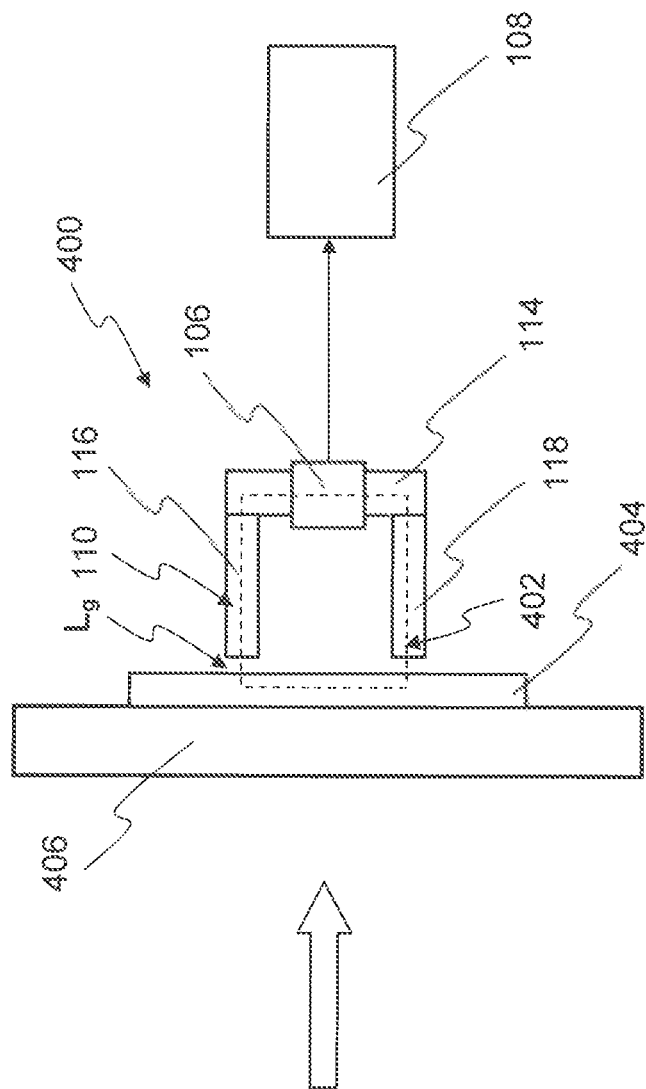
FIG. 4 shows a schematic illustration of a system for detecting abnormal movement of a gas turbine shaft according to a third embodiment of the present invention.

FIG. 4 illustrates a system 400 for detecting abnormal movement in a gas turbine shaft of a yet further embodiment of the invention. The system 400 is similar to that of system 100 shown in FIGS. 1a and 1b, and like reference numerals refer to like components. As can be seen, the system 400 comprises a magnetic circuit 402 formed from the first portion 110, and a second portion 404. The second portion 404 is directly coupled to a last stage of the gas turbine disc 406. For example, the second portion 404 may be welded to the last stage of the gas turbine disc 406. The second portion 404 is balanced, and coupled to the turbine disc such that vibrations induced by the additional mass of the second portion 404 are minimised.

The second portion 404 may be in the form of a circular disc, or a circular ring. The disc or ring preferably has an outer diameter substantially the same as the transverse width of the first portion 110 of the magnetic circuit. The second portion 404 is formed of a magnetic material and is similar to the second portion 112 described above.

The detection coil 106, and controller are the same as those described above.

The air gap, $L_g$, in the magnetic circuit 402 ensures that the reluctance, R, of the circuit is high under normal operating conditions. When an abnormal movement of the shaft, or turbine disc, occurs, the air gap reduces, and as described above the reluctance significantly increases over a short period of time inducing a voltage in the coil 106.

The system 400 is configured such that, even when an abnormal movement occurs, there is always an air gap between the distal ends of the arm portions 116 and 118 and the second portion 404 to prevent damage to the system.

The above described systems may be compact, and may have overall axial length of between about 15 mm about 50 mm, preferably between about 20 mm and about 30 mm. As such, the compact system may be particularly suited to smaller engines, such as gas turbines for helicopters.

The features of the embodiments described above with reference to the accompanying figures may be combined in any suitable manner. For example, the use of an electromagnet to provide the MMF in the magnetic circuit of system 400 is envisaged. Any other suitable combination of the above described features is also envisaged.

The invention claimed is:

1. A system for detecting breakage of a gas turbine shaft comprising:
    a magnetic circuit, forming one or more closed loop paths containing a magnetic flux, comprising a first magnetic portion and a second portion, and including at least one air gap between the first portion and the second portion; and
    a detection coil wound around the first magnetic portion;
    wherein, the second portion is coupled to or moveable with the gas turbine shaft to reduce the at least one air gap, on axial movement of the gas turbine shaft, to change the reluctance of the magnetic circuit and thereby induce a voltage in the detection coil.

2. The system according to claim 1, wherein the first magnetic portion comprises a permanent magnet.

3. The system according to claim 1, wherein the first magnetic portion comprises an electromagnet.

4. The system according to claim 3, wherein the first magnetic portion comprises a further coil wound around a soft magnetic material to form the electromagnet.

5. The system according to claim 4, wherein a constant current is applied to the further coil.

6. The system according to claim 4 wherein an alternating current is applied to the further coil.

7. The system according to claim 3, wherein a constant current is applied to the detection coil to power the electromagnet.

8. The system according to claim 1, wherein the first magnetic portion comprises a base portion, and two arm portions, the detection coil being wound around the base portion.

9. The system according to claim 3, wherein the base portion is formed of a soft magnetic material.

10. The system according to claim 8, wherein the second portion of the magnetic circuits sized to fit between the two arm portions with clearance.

11. The system according to claim 1, wherein the second portion is formed of a soft magnetic material.

12. The system according to claim 1, wherein the second portion of the magnetic circuit is fixed to a plunger, the plunger being coupled to or moveable with the gas turbine shaft.

13. The system according to claim 1, wherein the second portion of the magnetic circuit is fixed to a last stage of a turbine disc of a gas turbine.

14. The system according to claim 13 wherein the second portion is a disc or a ring.

15. The system according to claim 1, further comprising a controller coupled to the detection coil, the controller being configured to shut off power to a gas turbine when the induced voltage in the detection coil exceeds a threshold voltage.

16. The system according to claim 15, wherein the controller is further configured to filter the induced voltage output of the detection coil.

17. The system according to claim 1, wherein the gas turbine shaft is part of a gas turbine engine.

18. The system according to claim 17, wherein the gas turbine engine is a jet engine.

* * * * *